3,396,140
ORGANIC ACID RESISTANT COMPOSITIONS FROM EPOXY RESIN, POLYAMINE AND AMMONIUM CLAYS

Ernest E. Weller, Sayreville, N.J., assignor to Tile Council of America, Inc., New York, N.Y., a corporation of New York
No Drawing. Continuation-in-part of application Ser. No. 391,319, Aug. 21, 1964. This application July 6, 1965, Ser. No. 469,885
37 Claims. (Cl. 260—37)

This is a continuation-in-part of my earlier filed application, Ser. No. 391,319, filed Aug. 21, 1964.

This invention relates to epoxy resin compositions having improved chemical resistance and more particularly to polyepoxide compositions capable of being resinified at room temperature and exhibiting resistance to chemical attack, to methods of preparing such compositions and to methods of using them.

It is widely known that use of epoxy resins for many applications is prompted by the resistance of such resins, when cured, to a great variety of severe corrosion, e.g., chemical environments. Epoxy resin compositions that are heat cured exhibit great resistance to and stand up well under such corrosion environments. Frequently circumstances, including cost and convenience, dictate that a room temperature hardening material be employed in chemical containing environments.

It is well known, however, that the resistance of room temperature cured epoxides to certain chemical environments is low and in many instances completely unsatisfactory, and therefore such materials are ordinarily not used in areas where they are likely to be subjected to chemical attack.

Certain amine-type materials are commercially used as room temperature curing agents for polyepoxides, such as the commercially available glycidyl polyethers of polyhydric phenols. The products cured with such amine curing agents, however, tend to be prone to attack by chemical environments, especially organic acids. Lack of resistance to attack by organic acids is a property of epoxies cured with the so-called amine-type curing agents even when high curing temperatures are employed.

It is an object of the invention to provide polyepoxide resin compositions having improved resistance to deterioration when exposed to chemical environments, especially organic acids.

It is another object of the invention to provide hardenable polyepoxide resin compositions employing amine-type curing agents that upon curing form products that exhibit improved resistance to deterioration by concentrated organic acids.

It is a further object of the invention to provide means for making room temperature curing epoxide resin compositions resistant to attack by organic acids.

It is a further object of the invention to provide new means and methods for making polyepoxide resin products cured with amine-type curing agents resistant to attack by organic acids.

It is a further object of the invention to provide curable organic acid resistant polyepoxide resin systems which exhibit improved curing rates.

It is still a further object of the invention to provide organic acid resistant polyepoxide resin systems which when cured exhibit improved early age physical properties.

These and other objects of the invention will be apparent from the following detailed description thereof.

According to this invention there are provided hardenable epoxy resin compositions having the chemical resistant, physical, and curing properties described which comprise epoxy resin, an epoxy resin curing agent and in a sufficient amount a protective reactive colloid for the large resin molecules.

It has been discovered that when clay minerals that exhibit substantial base-exchange properties, and particularly those exhibiting comparatively high base-exchange properties and containing replaceable cations are incorporated into a polyepoxide composition adapted to be hardened at room temperature and/or employing an amine-type curing agent, the cured polyepoxide product exhibits surprisingly increased resistance to attack by concentrated organic acids. For example, a composition comprising a polyepoxide resin, an amine-type curing agent and a colloidal clay mineral will harden at room temperature into a product exhibiting the properties usually associated with heat cured polyepoxide resin coatings, adhesives, etc. Additionally, the cured composition surprisingly will be serviceable in areas where organic acid environments, even of a concentrated nature, will be encountered.

Clay minerals have the property of sorbing certain cations and retaining these in an exchangeable state. The common exchangeable cations are calcium, magnesium, potassium, and sodium, including mixtures thereof. The pH of the mineral material is indicative of the exchangeable cation that it carries, a pH of less than 7 suggesting hydrogen cations.

Clay minerals that are suitable for use in this invention are those exhibiting substantial base-exchange properties and replaceable cations such as alkali and alkaline-earth metals, hydrogen, including mixtures thereof. Typical suitable clay minerals include montmorillonite, viz. sodium, potassium, calcium, hydrogen and other bentonite clays, hectorite, saponite, attapulgite, illite, vermiculite and deolites. These minerals, characterized by an unbalanced crystal lattice, have negative charges which are normally neutralized by inorganic cations.

The base-exchange capacities of the various clay minerals enumerated run from about 15 to 150, based upon milliequivalents of exchangeable base per 100 grams of clay. The montmorillonite and vermiculite minerals have high base-exchange capacities, e.g., 80–100 and 100–150 respectively. Attapulgite has a comparatively high base-exchange capacity, e.g., 20–30. Generally, clay minerals which have a high base-exchange capacity, i.e., of at least 20, are most useful in the present invention.

Most suitable and preferred clay minerals for use in this invention are refined and substantially contaminant and grit free swelling and non-swelling montmorillonite minerals and bentonites of the Western and Southern types, attapulgite and vermiculite.

It has been found that when the exchangeable cations present in the clay minerals herein described are replaced by ammonium cations surprisingly improved cure rates and early physical strength of the cured polyepoxide system are obtained in addition to the forementioned resistance to organic acid environments. Advantages derived through this discovery are desirable in every coating, tile setting and adhesive operation.

In accordance with this invention 10 to about 100% of the exchangeable cations present in the clay minerals are exchanged for ammonium cation, generally 50 to about 100% are exchanged for ammonium cation, preferably, however, 90 to about 100% of the exchangeable cations are exchanged for ammonium cation.

The ammonium clay minerals are used in an amount of at least 10% by weight based on weight of epoxide resin and preferably in an amount of at least 50% by weight based on weight of epoxide present.

Various methods may be employed to bring about the replacement. The most common is simply the addition of aqueous ammonia to an aqueous slurry of the clay mineral so that the ammonium ion is in excess when based upon the cation-exchange capacity of the clay mineral in which the exchange is desirable. Removal of the aqueous phase and grinding or drum drying to the desired particle size is the last step before use.

A second method is the direct exchange of cations by passing gaseous ammonia through the solid, powdered clay mineral until the exchange is complete.

The resinous epoxides suitable for use in the present invention comprise those compounds having at least two epoxy groups, i.e., at least two

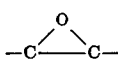

groups per molecule. The polyepoxides may be saturated or unsaturated, cycloaliphatic, aromatic, heterocyclic, or preferably aliphatic, and may be substituted if desired with substituents such as chlorine atoms, hydroxyl groups, ether radicals, and the like. They may also be monomeric or polymeric. The epoxy may be either present as a terminal or interior group.

Examples of the polyepoxides include, among others, the diacetate of epoxidized triglycerides as epoxidized glycerol trioleate and eporidized glycerol trilinoleate, glycerol dioleate, 1,4-bis(2,3-epoxypropoxy) benzene, 1,3-bis(2,3-epoxypropoxy)benzene, 4,4' - bis(2,3 - epoxypropoxy) diphenyl ether, 1,8,-bis(2,3 - epoxypropoxy)-octane, 1,4 - bis(2,3 - epoxypropoxy) - cyclohexane, 4,4'-bis(2-hydroxy - 3,4 - epoxybutoxy) - diphenyldimethylmethane, 1,3 - bis(4,5 - epoxypentoxy) - 5 - chloro-benzene, 1,4-bis(3,4-epoxybutoxy) - 2 - chlorocyclohexane, 1,3 - bis (2 - hydroxy - 3,4 - epoxybutoxy) benzene, 1,4 - bis and (2-hydroxy-4,5-epoxypentoxy) benezene.

Other examples include the epoxy polyethers of polyhydric phenols obtained by reacting a polyhydric phenol with a halogen containing epoxide in an alkaline medium. Polyhydric phenols that can be used for this purpose include, among others, resorcinol, catechol, hydroquinone, methyl resorcinol, or polynuclear phenols, such as 2,2-bis (4 hydroxyphenyl) propane (Bisphenol A), 2,2 - bis(4-hydroxyphenol) butane, 4,4' - dihydroxybenzophenone, bis(4 - hydroxyphenol) ethane, 2,2 - bis(4 - hydroxyphenol) pentane, and 1,5 - dihydroxynaphthalene. The halogen-containing epoxides may be further exemplified by 3 - chloro - 1, 2 - epoxybutane, 3 - bromo - 1, 3 - epoxyhexane,3-chloro-1, 2-epoxy-octane, and the like.

Preferred polyepoxides of this type are the glycidyl polyethers of dihydric phenols produced by this method from dihydric phenols and epichlorohydrin. The monomer products of this type may be represented by the general formula:

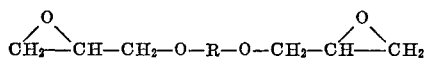

wherein R represents a divalent hydrocarbon radical of the dihydric phenol. The polymeric products will generally not be a single simple molecule but will be a complex mixture of gycidyl polyethers of the general formula:

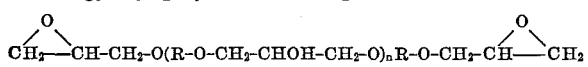

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy" (General Mills), "DER Resin" (Dow Chemical Company), "Araldite" (Ciba), "ERL Resins" (Bakelite Corporation), "Epi-Rez" (Jones Dabney), and "Epiphen" (The Borden Company).

Another group of polyepoxides that may be used comprise the glycidyl ethers of novalac resins, which resins are obtained by condensing an aldehyde with a polyhydric phenol. A typical member of this class is the epoxy resin formed from formaldehyde 2,2-bis(5-hydroxyphenol) propane novalac resin which contains as predominant constituent the substance represented by the formula

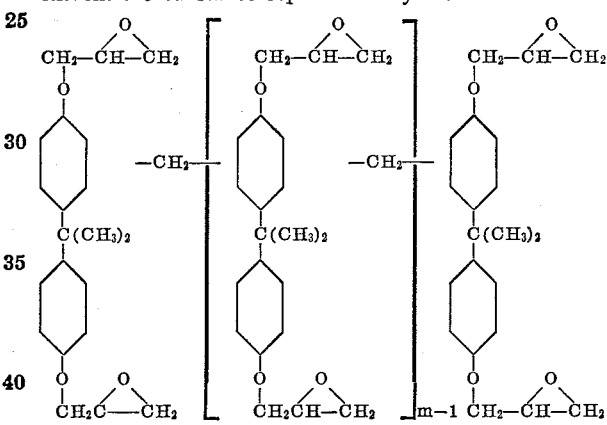

wherein $m$ is a value of at least 1.0.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear atom of the hydroxyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain.

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product of glycerol and bis(2,3-epoxypropyl) ether, the reaction product of sorbitol and bis(2,3-epoxy-2-methylpropyl) ether, the reaction product of pentaerythritol and 1,2-epoxy-4,5 epoxypentane, and the reaction product of bis-phenol and bis(2,3-epoxy-2-methylpropyl) ether, the reaction product of resorcinol and bis-(2-3-epoxypropyl) ether, and the reaction product of catechol and bis(2,3-epoxypropyl) ether.

Other polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymeriaztion at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate methyl methacrylate, dially phthalate, vinyl allyl phthalate, divinyl adipate, chlorallyl acetate, and vinyl methallyl pimelate. Illustrative examples of these polymers include poly (allyl, 2,3-epoxy-propyl ether), poly(2,3-epoxypropyl crotonate), allyl 2,2-epoxypropyl etherstyrene copolymer, methallyl 3,4-epoxybutyl etherallyl benzoate copolymer, poly(vinyl 2,3-epoxypropyl ether), allyl glycidyl ether-vinyl acetate copolymer and poly(4-glycidyloxstyrene).

Another group of polyepoxides include the epoxy esters of polybasic acids, such as diglycidyl phthalate and diglycidyl adipate, diglycidyl tetrahydrophthalate, diglycidyl maleate, and the like.

Particularly preferred members of the above-described group comprise the polymers of the 2-alkenyl glycidyl ethers having a molecular weight between 300 and 1000 and an epoxy equivalency greater than 1.0 and preferably between 1.2 and 6.0.

Other polyepoxides include the polyepoxy polyethers comprising ethers of epoxy alcohols and polyhydric alcohols such as obtained by reacting, preferably in the presence of an acid-acting compound as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentanediol, butylene glycol, glycerol, sorbitol, mannitol, pentaerythritol, polyallyl alcohol, polyvinyl alcohol, trimethylolpropane, bis(4-hydroxycyclohexyl) dimethylmethane, 1, 4-dimenthylolbenzene, and the like; polyhydric ether alcohols as triglycerol and dipentaerythritol; polyhydric thioethers, such as 2,2'-dihydroxydiethyl sulfide and 2,2'-2,3'-tetrahydroxy dipropyl sulfide; mercapto alcohols as alpha-monothioglycerol, alpha, alpha'-dithioglycerol; polyhydric alcohol partial esters such as monostearin, pentaerythritol monoacetate and the like; and halogenated polyhydric alcohols as the monochloride of pentaerythritol, monochloride or sorbitol, monochloride of glycerol, and the like.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

As cross-linking compounds for epoxy resin compositions, amine-type or polyfunctional amines have been found to be particularly useful. By the term "polyfunctional amines" as used herein; is meant organic compounds having at least one nitrogen atom and at least two active amino hydrogen atoms which can be on the same or different nitrogen atoms. Curable mixtures can be formed from epoxy resin compositions and polyfunctional amines at temperatures in the 20° C. to 30° C. range, and higher, if desired. Temperatures above 20° C. can be used when higher curing rates are desired or for any other purpose. Temperatures above 250° C., however, are not preferred.

These curable mixtures therefore are particularly useful for applications wherein high temperatures cannot be employed in curing.

Typical polyfunctional amines include the aliphatic primary amines, such as ethylamine, isopropylamine, n-butylamine, isobutylamine, 2-ethylhexylamine, monoethanolamine, monoisopropanolamine, beta alanine, cyclohexylamine, amides, e.g., formamide, acetamide, propionamide, n-butyramide, stearamide, and the like; aromatic primary amines, such as aniline, alpha-methylbenzylamine, and the like; heterocyclic primary amines, such as N-aminoethyl morpholine, N-aminopropyl morpholine; the aliphatic polyamines, such as ethylenediamine, diethylenetriamine, triethylenetetramine, tetraethylenepentamine, polyethylenepolyamines, propylenediamine, dipropylenetriamine, polypropylenepolyamines, butylenediamines, pentylenediamines, hexylenediamines, octylenediamines, nonylenediamines, decylenediamines, dimethylurea, 1,3-diamino-2-propanol, 3,3'-imino-bis(propylamine), guanidine, and the like; aromatic polyamines, such as meta-ortho-and para-phenylenediamines, 1,4-naphthalenediamine, 1,4-anthradiamine, 3,3'-biphenyldiamine, xylylenediamine, 3,4-biphenylamine, 3,4-toluenediamine, alpha, alpha'-biparatoluidine, para,para'-methylenedianiline, 1-methoxy - 6 - methylmeta - phenylenediamine, para,para'-sulfonyldiamine, and the like; and heterocyclic polyamines, such as piperazine, 2,5-dimethylpiperazine melamine, 2,4 - diamine - 5 - (amino - methyl)pyrimidine, 2,4,6-triaminopyrimidine, 3,9-bis (aminoethyl) apirobimetadioxane, and the like.

Other polyfunctional amines include the low molecular weight polyamides, which are condensation products of polycarboxylic acids, in particular, hydrocarbon dicarboxylic acids, with polyamines, particularly diamines, such as those monomeric diamines previously listed. Typical polyamides are prepared in accordance with known condensation procedures from adipic acid and hexamethylene diamine, dilinoleic acid and ethylenediamine, terephthalic acid and diethylenetriamine and the like.

Amido-amines produced by the reaction of polyamines of the type described with monocarboxylic acids or mixtures of monocarboxylic and polycarboxylic acids wherein a stoichiometric excess of the polyamine is used are suitable hardeners. Particularly suitable and preferred are those amido amines having amine numbers in excess of 400 (equivalent weight of 145 or less).

Still other illustrations of polyfunctional amines are the addition products or adducts, of polyamines, in particular diamines and triamines, and low molecular weight epoxides containing oxirane oxygen linked to vicinal carbon atoms, such as ethylene oxide, propylene oxide, butadiene dioxide, diglycidyl ether, epoxidized soy-bean oil, epoxidized safflower oil, and the like, and polyglycidyl polyethers of polyhydric phenols. Particularly useful polyfunctional amines are the mono- and poly-hydroxyalkyl polyalkylene polyamines which can be prepared by the addition reaction of polyalkylene polyamines, preferably ethylenediamine, propylenediamine, diethylenetriamine, dipropylenetriamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylenediamine, N,N' - bis (hydroxyethyl) ethylenediamine, N-bis (hydroxyethyl) diethylenetriamine, N,N-bis (hydroxyethyl) diethylenetriamine, N,N''-bis (hydroxyethyl) diethylenetriamine, N-hydroxypropyl-diethyl-enetriamine, N,N-bis (hydroxypropyl) diethylenetriamine, N,N''-bis (hydroxypropyl) diethylenetriamine, N - hydroxyethylpropylenediamine, N - hydroxypropylpropylenediamine, N - hydroxyethyldipropylenetriamine, N,N-bis (hydroxyethyl) dipropylenetriamine, N,N-bis (hydroxyethyl) dipropylenetriamine, tris (hydroxyethyl) triethylenetetramine and the like. Other particularly useful epoxide-polyamine adducts can be prepared with known procedures by the addition reaction of polyglycidyl polyethers of dihydric phenols and the polyamines, in particular, polyalkylene polyamines. Of particular importance in forming these epoxide polyamine adducts are the diglycidyl diethers of dihydric phenols, such as, for example, the isomers of dihydroxydiphenylmethanes singularly or mixed and the dihydroxydiphenyldimethylpropanes singularly or mixed. Mixtures of diglycidyl polyethers of dihydric phenols containing a predominance of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyfunctional amine or epoxide-polyamine adduct itself can be prepared by mixing the diglycidyl polyether of a dihydric phenol with a polyalkylene diamine such as diethylenetriamine, dipropylenetriamine and the like, and bringing to an elevated teperature up to about 200° C. and maintaining at such an elevated temperature for a period of from 4 to 5 hours. Alternatively, as an illustration, polyfunctional amines or epoxide polyamine adducts can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyfunctional amines include the low molecular weight addition products of a polyamine, preferably a polyalkylene polyamine such as those listed above and a vinyl group-containing compound. Typical vinyl group-containing compounds are, for example, ethylene, propylene, 1-butene, isobutene, acrolein, vinyl chloride, vinylidene chloride, vinyl acetate, acrylonitrile, styrene and the like. The polyfunctional amines or vinyl polyamine adducts can be prepared in accordance with known procedures by reacting a polyamine and a vinyl group-containing compound in various proportions at a temperature in the range from 20° C. to 100° C. and removing unreacted materials and low boiling material by vacuum distillation.

Other polyfunctional amines having a total of at least two active amino hydrogen atoms to the molecule can be advantageously employed in the epoxide compositions of this invention. For example, such polyfunctional amines as mixtures of para,para'-methylenedianiline and metaphenylenediamine or other mixtures of two or more polyfunctional amines can be used. Particularly valuable resins made in accordance with this invention are obtainable from our epoxide compositions and polyfunctional amines as described above which have melting points or melting point ranges below about 150° C.

In making the epoxy resin compositions of this invention, if desired, the epoxy resins can be compounded with other resins, such as polystyrene resins, polyester resins, and so forth, to increase the flexibility of the hardened composition or for any other purpose.

Various types of inert pigments and fillers may also be incorporated into the epoxy compositions. As examples of such fillers may be mentioned blanc fixe, talc, pyrophyllite, diatomaceous earth, silica aerogel, finely divided sand and other like inert materials. The fillers are preferably in a fine state of subdivision and have high surface areas.

Color materials may be added to the compositions if desired. The coloring materials include organic and inorganic coloring materials. As examples may be mentioned titanium dioxide and carbon black. Coloring materials should be selected, however, so as to be non-reactive with the epoxy resins and other ingredients at atmospheric temperature, as otherwise this might cause poor storage stability and also affect retention of adhesiveness.

The composition of the present invention may also have incorporated therein, if desired, a lubricant, such as silicone oils, silicone jelly, petroleum jellies and so forth. As an example of the silicone oil may be mentioned organosiloxane liquid supplied as Silicone Liquid No. 81069. Any of the commercially available silicone jellies which are sold under a wide variety of trademarks and tradenames may be used.

In forming the epoxy resin compositions of the invention, enough of the hardeners disclosed herein are admixed with the epoxy resin to insure that good hardening of the resin is achieved. The amount of the amine-type curing agent to be used will vary over a wide range. Good cures are obtained by reacting the polyepoxide with at least .8 equivalent of the amine-type curing agent. As used herein relative to the amount of the amine-type curing agent, the expression "equivalent amount" refers to that amount of the agent needed to furnish one amino-substituted hydrogen atom for every epoxy group in the polyepoxide to be involved in the cure. To obtain the best results, the amine-type curing agent should be employed in about at least a chemical equivalent amount, and more preferably in equivalent ratio of 1:1 to 1.5:1.

The manner in which the present invention may be practiced will be clear from the following examples which are to be considered illustrative rather than limiting.

EXAMPLE 1

The following epoxide resin composition was prepared for use in this example:

Composition A

| Resin portion: | Percent |
| --- | --- |
| Phenyl glycidyl ether | 6.01 |
| Bisphenol A | 1.26 |
| Epoxide resin | 63.19 |
| Polystyrene resin | 26.62 |
| Petroleum jelly | 2.92 |
| | 100.00 |

| Hardener portion: | |
| --- | --- |
| Silica | 86.19 |
| Amido amine curing agent | 11.40 |
| Diethylene triamine | 0.35 |
| Carbon black | .05 |
| Silica aerogel | 2.01 |
| | 100.00 |

For use these materials are mixed 1.0 weight part of the resin portion for 3.33 weight parts of the hardener portion. The resin is liquid and the hardener is liquid adsorbing on inert filler and is in the form of a dry powder. The liquid epoxy resin and dry power hardener react on mixing and cure at room temperature.

The epoxide resin used in this composition was of the diglycidyl ether of Bisphenol A having an epoxide equivalent of 185–195 and a viscosity of 100–160 poises at 25° C. The epoxide resin is the reaction product of epichlorohydrin and Bisphenol A. The polystyrene resin was olefin modified and was completely non-reactive. The amido amine hardener was prepared by reacting Tall Oil with an excess of polyamine. The amine is identified as EM–308 and marketed by Thiokol Chemical Company. The amido amine hardener had an amine value of about 425, an equivalent weight of about 135–138 and a viscosity of 2–5 poises at 25° C.

To 100 weight parts of the above Composition A was added 10 weight parts of a sodium bentonite purchased under the trade name Bentolite H. Bentolite H is a white, high gelling Bentonite having a pH of 9–10 at 10% solids in water and contains about 85% montmorillonite.

From this epoxy-bentonite mixture were cast two 2" x 2" x 2" cubes, several 1" x 1" cylinders, two 1" x 6" x ¼" bars and a cure time strip 40 mils thick through which is drawn a brass cone at a fixed rate thus showing a time related to cure by the disappearance of a scribed mark left by the brass cone.

A second set of samples were prepared from an epoxy-bentonite mixture consisting of 100 weight parts of the above-described Composition A and 10 weight parts of an ammonium bentonite prepared from the sodium bentonite as follows:

A slurry was prepared of the above sodium bentonite in water which contained 10 weight parts of bentonite in 90 weight parts of water. Liquid ammonium hydroxide was added to a pH of at least 12.5. The slurry was agitated for about 1 hour, filtered, washed with water and then placed in an oven at 105° C. to dry. It is formed by adding ammonium hydroxide to a pH of about 12.5 that substantially all of the exchangeable cations are exchanged for ammonium cation, i.e., about 100% of the exchangeable cations are exchanged. The remaining solid was then pulverized for use in this example.

The resultant ammonium bentonite has a pH of about 8.6 at a concentration of 10% solids in water. The product is non-swelling in water as contrasted with the sodium bentonite.

The following surprising results were obtained from the above described samples.

|  | Epoxy Mixture with Sodium Bentonite | Epoxy Mixture with Ammonium Bentonite |
|---|---|---|
| Cure Time, hours | 25.0 | 18.4 |
| Compressive Strength, p.s.i. at 7 days | 3,500 3,375 | 5,962 5,950 |
| Ames Hardness (48 hours) | (¹) | 30.0 |

¹ Not measurable on Ames Scale.

The substantial improvement of physical strength is an advantage allowing earlier use of areas utilizing the improved epoxy systems provided by this invention. A money and man hour savings is provided.

When tested in boiling 50% acetic acid both materials performed excellently showing high resistance to attack as indicated by a weight gain of only 3.6% and 3.2% respectively for the sodium bentonite and ammonium bentonite containing epoxy resin systems.

EXAMPLE 2

The following clay minerals were used in this example:
(a) A highly colloidal bentonite containing about 85% calcium montmorillonite having a pH of 7.4 purchased under the trade name "Whittaker #2274 Colloidite."
(b) An attapulgite clay having a needlelike particle shape, a pH of 7.5–9.0 and average particle size of 0.12 micron. The clay product was purchased under the trade name "Attagel 30."
(c) A high gelling, swelling sodium bentonite purchased under the trade name "Black Hills Western Bentonite," 325 mesh grade.
(d) A vermiculite of the expanded type which was pulverized to at least 200 mesh purchased under the trade name "Zonolite."
(e) A highly purified calcium bentonite approximately 85% calcium montmorillonite purchased under the trade name "Gelwhite LV."
(f) A sodium bentonite 200 mesh in size purchased under the trade name "Hi-Colloidal Bentonite."

Each of these clay minerals was slurried in water as was the bentonite of Example 1 and to each slurry was added an excess of liquid ammonium hydroxide to a pH of at least 12.5.

The mixtures were agitated, filtered, washed and dried as in Example 1.

The resultant ammonium clay minerals were ground to at least 200 mesh for use in this example and for convenience are referred to as follows:

(a) Ammonium "Colloidite"
(b) Ammonium "Attagel"
(c) Ammonium "Black Hills Bentonite"
(d) Ammonium "Zonolite"
(e) Ammonium "Gelwhite"
(f) Ammonium "Hi-Colloidal Bentonite"

As in Example 1, 10 weight parts of these ammonium bentonites and their original forms were separately mixed with 100 weight parts of the epoxy resin composition described in Example 1.

From each of the 12 mixtures were cast two 2″ x 2″ x 2″ cubes, two 6″ x 1″ x ¼″ bars, several 1″ x 1″ cylinders and a cure time strip 40 mils thick.

The following results were obtained:

| Compositions Containing the Following Ammoniated Clay Minerals | Reduction in Cure Time when Compared to Unammoniated Clay Mineral Containing Composition | Increase of Compressive Strength when Compared to Unammoniated Clay Mineral Containing Composition |
|---|---|---|
|  | Percent | Percent |
| (a) Ammonium "Colloidite" | 28.7 | 23.6 |
| (b) Ammonium "Attagel" | 16.0 | 7.1 |
| (c) Ammonium "Black Hills Bentonite" | 13.8 | 47.2 |
| (d) Ammonium "Zonolite" | 9.0 | 20.9 |
| (e) Ammonium "Gelwhite" | 11.1 | 19.9 |
| (f) Ammonium "Hi-Colloidal Bentonite" | 18.1 | 8.4 |

All of the compositions, whether ammonium clay minerals are incorporated or the original clay minerals are incorporated, exhibited excellent resistance to organic acids.

The above examples clearly show unexpected and unobvious improvements that are obtained by using the ammonium cation exchanged clay material of the present invention as compared with the alkali metal and alkaline earth metal clay materials.

Though the alkali metal and the alkaline earth metal clays exhibit excellent resistance to organic acids, the ammonium clay materials show an unexpected improvement in the reduction of curing time and in the increase of compressive strength, as well as also showing resistance to attack by organic acids.

The present invention, as described and set forth in the above examples, provides means for making epoxide resin compositions which cure at room temperatures and which have improved resistance to attack by acids, and which cure in substantially less time and to a greater degree of hardness than similar type epoxide resins.

The epoxide resin and/or hardeners may be liquids or free flowing powders. When either the resin or hardener is a liquid, and free flowing powder compositions are desired, the liquid resin or hardener may be absorbed on a suitable finely divided solid, inert carrier such as finely divided silica, silica aerogel and the like.

Regardless of whether the systems are liquid or solid, the clays may be admixed with either the resin portion, the hardener portion or the admixed resin-hardener portions.

Epoxy resin compositions of the present invention may be used to good advantage as trowellable mortars and grouts to set tile and brick and to fill the joints between the tiles, particularly where a fast curing adhesive that cures at about room temperature to a hard bonding material is desired.

The epoxy resin compositions of the present invention bond exceedingly well to almost any substratum and may be used as coatings, films, adhesives and filleting materials.

The compositions and methods of the inventor are particularly useful in making adhesive bonding compositions, which can be used for setting tile, and particularly as an adhesive bonding composition and/or protective coating material which can be used in acid environments.

The invention, in its broader aspects, is not limited to the specific steps, methods, compositions and improvements shown and described herein, but departures may be made within the scope of the accompanying claims without departing from the principles of the invention, and without sacrificing advantages.

What is claimed is:
1. An epoxy resin polyfunctional amine composition which comprises:
(a) an epoxy resin having at least two

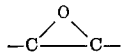

groups per molecule;
(b) ammonium cation containing clay mineral capable of imparting improved organic acid resistance to said composition, in a sufficient amount to impart improved organic acid resistance to said composition, and in an amount of at least 10 percent by weight based on weight of said epoxy resin, said clay mineral exhibiting a base-exchange capacity of at least about 15; and
(c) a polyfunctional amine curing agent capable of curing said epoxy resin at about room temperature and in sufficient amount to cure said epoxy resin at about room temperature.

2. The composition of claim 1 wherein said clay mineral is present in said composition in the amount of at least about 50 percent by weight based on the weight of the epoxy resin.

3. An epoxy resin-polyfunctional amine composition which comprises:
(a) an epoxy resin having at least two

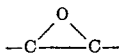

groups per molecule;
(b) ammonium cation containing clay mineral capable of imparting improved organic acid resistance to said composition, in a sufficient amount to impart improved organic acid resistance to said composition and in an amount of at least 10 percent by weight based on weight of said epoxy resin, said clay mineral exhibiting a base-exchange capacity of at least 20; and
(c) a polyfunctional amine curing agent capable of curing said epoxy resin at about room temperature and in sufficient amount to cure said epoxy resin at about room temperature.

4. A method for making tile surface resistant to attack by organic acid which comprises placing tile on a substrate containing a mortar so as to leave spaces between the tiles, preparing an epoxy resin adhesive composition for filling the spaces between the tiles, making said epoxy resin composition resistant to organic acid attack by adding to said composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral comprising ammonium attapulgite, adding to said epoxy resin composition a sufficient amount of a polyfunctional amine curing agent, capable of curing said epoxy resin at about room temperature, to cure said epoxy resin at about room temperature, filling the spaces between said tiles with said composition, curing said epoxy resin composition at about room temperature and exposing said cured composition and tile surface to an organic acid environment.

5. The composition of claim 3 wherein 10 to about 100 percent of the exchangeable cations present in said clay mineral are exchanged for ammonium cations.

6. The composition of claim 3 wherein said clay mineral consists essentially of ammonium montmorillonite.

7. A method for making tile surface resistant to attack by organic acid which comprises placing tile on a substrate containing a mortar so as to leave spaces between the tiles, preparing an epoxy resin adhesive composition for filling the spaces between the tiles, making said epoxy resin composition resistant to organic acid attack by adding to said composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral comprising ammonium vermiculite, adding to said epoxy resin composition a sufficient amount of a polyfunctional amine curing agent, capable of curing said epoxy resin at about room temperature, to cure said epoxy resin at about room temperature, filling the spaces between said tiles with said composition, curing said epoxy resin composition at about room temperature and exposing said cured composition and tile surface to an organic acid environment.

8. The composition of claim 3 wherein said clay mineral consists essentially of ammonium attapulgite.

9. The composition of claim 3 wherein said clay mineral consists essentially of ammonium vermiculite.

10. An adhesive composition which comprises:
(a) an epoxy resin having at least two

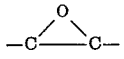

groups per molecule;
(b) ammonium cation containing clay mineral capable of imparting improved organic acid resistance to said composition, in a sufficient amount to impart improved organic acid resistance to said composition and in an amount of at least 10 percent by weight based on said epoxy resin, said clay mineral exhibiting a base-exchange capacity of at least 15, said clay mineral being a member selected from the group consisting of montmorillonite, attapulgite, hectorite, saponite, illite and zeolite; and
(c) a polyfunctional amine curing agent capable of curing said epoxy resin at about room temperature and in sufficient amount to cure said epoxy resin at about room temperature.

11. An adhesive bonding composition which comprises:
(a) an epoxy resin having at least two

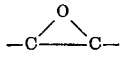

groups per molecule;
(b) ammonium cation containing clay mineral capable of imparting improved organic acid resistance to said composition, in a sufficient amount to impart improved organic acid resistance to said composition, and in an amount of at least 10 percent by weight based on weight of said epoxy resin, said clay mineral exhibiting a base-exchange capacity of at least 20, said clay mineral being a member selected from the group consisting of montmorillonite, attapulgite, vermiculite, hectorite, saponite and illite; and
(c) a polyfunctional amine curing agent capable of curing said resin at about room temperature and in sufficient amount to cure said epoxy resin at about room temperature.

12. The composition of claim 11 wherein 50 to about 100 percent of the exchangeable cations present in said clay mineral are exchanged for ammonium cations.

13. The composition of claim 11 wherein said clay mineral comprises ammonium montmorillonite.

14. An adhesive coating composition which comprises:
(a) an epoxy resin having at least two

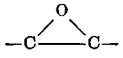

groups per molecule;
(b) ammonium cation containing clay mineral capable of imparting improved organic acid resistance to said composition, in a sufficient amount to impart improved organic acid resistance to said composition and in an amount of at least 10 percent by weight based on weight of said epoxy resin, said clay mineral exhibiting a base-exchange capacity of at least 20, said clay mineral being a member selected from the group consisting of montmorillonite, attapulgite, vermiculite, hectorite, saponite and illite; and (c) a polyfunctional amine curing agent capable of curing said epoxy resin at about room temperature and in sufficient amount to cure said epoxy resin at about room temperature.

15. The composition of claim 14 wherein 50 to about 100 percent of the exchangeable cations present in said clay mineral are exchanged for ammonium cations.

16. An adhesive coating composition which comprises:
(a) an epoxy resin having at least two

groups per molecule;
(b) ammonium cation containing clay mineral capable of imparting improved organic acid resistance to said composition, in a sufficient amount to impart improved organic acid resistance to said composition and in an amount of at least 10 percent by weight based on weight of said epoxy resin, said clay mineral exhibiting a base-exchange capacity of at least 20, said clay mineral comprising ammonium montmorillonite; and
(c) a polyfunctional amine curing agent capable of curing said epoxy resin at about room temperature and in sufficient amount to cure said epoxy resin at about room temperature.

17. An adhesive grout and mortar composition which comprises:
(a) an epoxy resin having at least two

groups per molecule;
(b) ammonium cation containing clay mineral capable of imparting improved organic acid resistance to said composition, in a sufficient amount to impart improved organic acid resistance to said composition and in an amount of at least 10 percent by weight based on weight of said epoxy resin, said clay mineral exhibiting a base-exchange capacity of at least 20, said clay mineral being a member selected from the group consisting of montmorillonite, attapulgite, vermiculite, hectorite, saponite and illite; and
(c) a polyfunctional amine curing agent capable of curing said epoxy resin at about room temperature and in sufficient amount to cure said resin at about room temperature.

18. The composition of claim 17 wherein 50 to about 100 percent of the exchangeable cations present in said clay mineral are exchanged for ammonium cations.

19. An adhesive grout and mortar composition which comprises:
(a) an epoxy resin having at least two

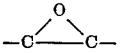

(b) ammonium cation containing clay mineral capable of imparting improved organic acid resistance to said composition, in a sufficient amount to impart improved organic acid resistance to said composition and in an amount of at least 10 percent by weight based on weight of said epoxy resin, said clay mineral exhibiting a base-exchange capacity of at least 20, said clay mineral comprising ammonium montmorillonite; and
(c) a polyfunctional amine curing agent capable of curing said epoxy resin at about room temperature and in sufficient amount to cure said resin at about room temperature.

20. A room temperature cured epoxy resin and polyfunctional amine composition having improved resistance to attack by organic acid which contains, as the ingredient imparting improved resistance to attack by organic acid, ammonium cation containing clay mineral, in an amount of at least 10 percent by weight based on weight of said epoxy resin, said clay mineral being a member selected from the group consisting of montmorillonite, attapulgite, vermiculite, hectorite, saponite, illite and zeolite, and a sufficient amount of said polyfunctional amine to have cured said epoxy resin at about room temperature.

21. A method for making a surface resistant to attack by organic acid which comprises preparing an epoxy resin adhesive coating composition, making said epoxy resin composition resistant to attack by organic acid by adding to said coating composition a sufficient amount of ammonium cation containing clay mineral to impart improved resistance to attack by organic acid to said epoxy resin composition, said clay mineral exhibiting a base-exchange capacity of at least 15 and being added in an amount of at least 10 percent by weight based on said epoxy resin, adding to said epoxy resin composition a sufficient amount of a polyfunctional amine curing agent, capable of curing said epoxy resin at about room temperature, to cure said epoxy resin at about room temperature, coating said surface with said composition, curing said epoxy resin composition on said surface at about room temperature and exposing said cured coating composition to an organic acid environment.

22. A method for making tile surface resistant to attack by organic acid which comprises placing tile on a substrate containing a mortar so as to leave spaces between the tiles, preparing an epoxy resin adhesive composition for filling the spaces between the tiles, making said epoxy resin composition resistant to organic acid attack by adding to said composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral being selected from the group consisting of montmorillonite, attapulgite, hectorite, saponite and illite, adding to said epoxy resin composition a sufficient amount of a polyfunctional amine curing agent, capable of curing said epoxy resin at about room temperature, to cure said epoxy resin at about room temperature, filling the spaces between said tiles with said composition, curing said epoxy resin composition at about room temperature and exposing said cured composition and tile surface to an organic acid environment.

23. The method of claim 22 wherein 10 to about 100 percent of the exchangeable cations in said clay mineral are exchanged for ammonium cations.

24. The method of claim 22 wherein 50 to about 100 percent of the exchangeable cations present in said clay mineral are exchanged for ammonium cations.

25. A method for making tile surface resistant to attack by organic acid which comprises placing tile on a substrate containing a mortar so as to leave spaces between the tiles, preparing an epoxy resin adhesive composition for filling the spaces between the tiles, making said epoxy resin composition resistant to organic acid attack by adding to said composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral comprising ammonium montmorillonite, adding to said epoxy resin composition a sufficient amount of a polyfunctional amine curing agent, capable of curing said epoxy resin at about room temperature, to cure said epoxy resin at about room temperature, filling the spaces between said tiles with said composition, curing said epoxy resin composition at about room temperature and exposing said cured composition and tile surface to an organic acid environment.

26. A method for making a surface resistant to attack by organic acid which comprises preparing an epoxy resin adhesive coating composition, making said epoxy resin composition resistant to attack by organic acid by adding to said coating composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral comprising ammonium attapulgite, adding to said epoxy resin composition a sufficient amount of a polyfunctional amine curing agent, capable of curing said epoxy resin at about room temperature, to cure said epoxy resin at about room temperature, coating said surface with said composition, curing said epoxy resin composition on said surface at about room temperature and exposing said cured coating composition to an organic acid environment.

27. The method of claim 22 wherein said polyfunctional amine comprises a polyamide hardening agent.

28. The method of claim 22 wherein said polyfunctional amine comprises an amido amine hardening agent.

29. A method for making a surface resistant to attack by organic acid which comprises preparing an epoxy resin adhesive coating composition, making said epoxy resin composition resistant to attack by organic acid by adding to said coating composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral being selected from the group consisting of montmorillonite, attapulgite, hectorite, saponite and illite, adding to said epoxy resin composition a sufficient amount of a polyfunctional amine curing agent, capable of curing said epoxy resin at about room temperature, to cure said epoxy resin at about room temperature, coating said surface with said composition, curing said epoxy resin composition on said surface at about room temperature and exposing said cured coating composition to an organic acid environment.

30. The method of claim 29 wherein 10 to about 100 percent of the exchangeable cations in said clay mineral are exchanged for ammonium cations.

31. The method of claim 29 wherein 50 to about 100 percent of the exchangeable cations present are exchanged for ammonium cations.

32. A method for making a surface resistant to attack by organic acid which comprises preparing an epoxy resin adhesive coating composition, making said epoxy resin composition resistant to attack by organic acid by adding to said coating composition a sufficient amount of an ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral comprising ammonium montmorillonite, adding to said epoxy resin composition a sufficient amount of a polyfunctional amine curing agent, capable of curing said epoxy resin at about room temperature, to cure said epoxy resin at about room temperature, coating said surface with said composition, curing said epoxy resin composition on said surface at about room temperature and exposing said cured coating composition to an organic acid environment.

33. A method for making a surface resistant to attack by organic acid which comprises preparing an epoxy resin adhesive coating composition, making said epoxy resin composition resistant to attack by organic acid by adding to said coating composition a sufficient amount of ammonium cation containing clay mineral to impart improved resistance to attack by organic acid to said epoxy resin composition, said clay mineral exhibiting a base-exchange capacity of at least 20 and being added in an amount of at least 10 percent by weight based on said epoxy resin, said clay mineral comprising ammonium vermiculite, adding to said epoxy resin composition a sufficient amount of a polyfunctional amine curing agent, capable of curing said epoxy resin at about room temperature, to cure said epoxy resin at about room temperature, coating said surface with said composition, curing said epoxy resin composition on said surface at about room temperature and exposing said curing coating composition to an organic acid environment.

34. The method of claim 29 wherein said polyfunctional amine comprises a polyamide hardening agent.

35. The method of claim 29 wherein said polyfunctional amine comprises an amido amine hardening agent.

36. A new article of construction which is resistant to attack by organic acids which comprises tiles bonded to a support; said tiles being spaced so as to leave open spaces between said tiles; the spaces between said tiles containing a cured epoxy resin adhesive composition which comprises:

(a) an epoxy resin having at least two

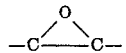

groups per molecule;

(b) a sufficient amount of ammonium cation containing clay mineral to impart improved resistance to attack by organic acid to said composition and in an amount of at least 10 percent by weight based on weight of said epoxy resin, said clay mineral exhibiting a base-exchange capacity of at least 20, said clay mineral being a member selected from the group consisting of montmorillonite, attapulgite, hectorite, saponite, bentonite and illite; and (c) a polyfunctional amine curing agent capable of curing said epoxy resin at about room temperature and in sufficient amount to have cured said epoxy resin at about room temperature.

37. A new article of construction which is resistant to attack by organic acids which comprises an organic acid resistant coating adhesively bonded to a surface, said coating comprising:

(a) an epoxy resin having at least two

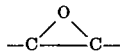

groups per molecule;

(b) a sufficient amount of ammonium cation containing clay mineral to impart improved resistance to attack by organic acid to said composition and in an amount of at least 10 percent by weight based on weight of said epoxy resin, said clay mineral exhibiting a base-exchange capacity of at least 20, said clay mineral being a member selected from the group consisting of montmorillonite, attapulgite, hectorite, saponite, bentonite and illite; and (c) a polyfunctional amine curing agent capable of curing said resin at about room temperature and in sufficient amount to have cured said epoxy resin at about room temperature.

References Cited

UNITED STATES PATENTS

| | | | |
|---|---|---|---|
| 2,710,244 | 6/1955 | Bertorelli | 106—72 |
| 2,773,043 | 12/1956 | Zuqas | 260—37 |
| 2,944,036 | 7/1960 | Floyd et al. | 260—37 |
| 3,209,500 | 10/1965 | Bernett | 260—37 |
| 3,228,911 | 7/1966 | Rogier | 260—37 |

MORRIS LIEBMAN, *Primary Examiner.*

J. E. CALLAGHAN, *Assistant Examiner.*